US006702955B1

(12) United States Patent
Murakami et al.

(10) Patent No.: US 6,702,955 B1
(45) Date of Patent: Mar. 9, 2004

(54) LIQUID CRYSTAL POLYMER COMPOSITION FOR CONNECTORS AND CONNECTOR

(75) Inventors: Haruji Murakami, Shizuoka (JP); Mineo Ohtake, Tokyo (JP)

(73) Assignee: Polyplastics Co., Ltd., Osaka (JP)

( * ) Notice: Subject to any disclaimer, the term of this patent is extended or adjusted under 35 U.S.C. 154(b) by 0 days.

(21) Appl. No.: 09/857,110

(22) PCT Filed: Dec. 10, 1999

(86) PCT No.: PCT/JP99/06957

§ 371 (c)(1),
(2), (4) Date: Jun. 1, 2001

(87) PCT Pub. No.: WO00/37566

PCT Pub. Date: Jun. 29, 2000

(30) Foreign Application Priority Data

Dec. 18, 1998 (JP) .......................................... 10-360695

(51) Int. Cl.[7] ................................................ C09K 19/52

(52) U.S. Cl. ................................... 252/299.01; 525/152

(58) Field of Search ............. 252/299.01; 524/404–406, 524/449–451, 513–514, 413–415; 525/132–133, 152

(56) References Cited

U.S. PATENT DOCUMENTS 4,888,127 A 12/1989 Wada et al.
4,889,886 A 12/1989 Wada et al.
5,391,689 A 2/1995 Kageyama et al.
5,492,946 A 2/1996 Huspeni et al.
5,530,047 A * 6/1996 Wantanabe et al. ......... 524/405
5,804,634 A * 9/1998 Umetsu et al. ............. 524/466
5,830,940 A * 11/1998 Nakamura et al. .......... 524/404

FOREIGN PATENT DOCUMENTS

| | | |
|---|---|---|
| EP | 0 856 536 | 8/1998 |
| JP | 63-146958 A | 6/1988 |
| JP | 06116373 A | 4/1994 |
| JP | 08325446 | 12/1996 |
| JP | 11335532 A | 12/1999 |
| WO | WO 97/24404 | 7/1997 |
| WO | WO 98/55547 | 12/1998 |

* cited by examiner

*Primary Examiner*—Mark F. Huff
*Assistant Examiner*—Jennifer R. Sadula
(74) *Attorney, Agent, or Firm*—Burns, Doane, Swecker & Mathis, L.L.P.

(57) ABSTRACT

To provide a material improved in dimensional accuracy and reduced in the extent of deformation caused by warpage without suffering from a serious reduction in mechanical properties such as flexural properties, and suitable for connectors which have a ratio (L/t) of the length (L) of the product to the average thickness (t) thereof of at least 100 and a ratio (L/h) of the length (L) of the product to the height (h) thereof of at least 10. A liquid crystal polymer composition for connectors, having a ratio (L/t) of the length (L) of the product to the average thickness (t) thereof of at least 100 and a ratio (L/h) of the length (L) of the product to the height (h) thereof of not exceeding 10, which is obtained by blending 100 parts by weight of a liquid crystal polymer (A) with 5 to 100 parts by weight of a fibrous filler (B) having an average fiber diameter of 0.5 to 20 μm and an average aspect ratio of 10 or less and 5 to 100 parts by weight of a particulate filler (C) having an average particle diameter of 0.1 to 50 μm, the total amount of the fillers not exceeding 150 parts by weight.

19 Claims, 1 Drawing Sheet

LIQUID CRYSTAL POLYMER COMPOSITION FOR CONNECTORS AND CONNECTOR

BACKGROUND OF THE INVENTION

1. Technical Field

The present invention relates to a liquid crystal polymer composition containing a fibrous filler and a particulate filler, and more particularly, it relates to a connector molded from such a liquid crystal polymer composition and excellent in prevention of deformation caused by warpage.

2. Background Art

Liquid crystal polymers, which are capable of forming an anisotropic molten phase, have been known as good materials having a dimensional accuracy among the thermoplastic resins. However, in the fields of electric and electronic parts in recent years, requests are becoming more and more severe for high precision, labor saving and low cost. Moreover, there has been a demand for heat resistance of the resinous parts and for dimensional accuracy of molded products at high temperature for purposes of making the products lighter in weight and smaller in size. Particularly, in view of the properties such as heat resistance and fluidity, the liquid crystal polymer is used in connectors with many terminals wherein a ratio (L/t) of the length (L) of the product to the average thickness (t) thereof is at least 100 and ratio (L/h) of the length (L) of the product to the height (h) thereof is at least 10. That is, in the case of common connectors with L/t of less than 70, there is almost no problem of deformation caused by warpage even if the liquid crystal polymer just filled with glass fiber. On the other hand, in the case of ones having L/t of 70 or more, there is a tendency to sudden increase in deformation caused by warpage after a molding or after an IR reflow due to a difference in shrinkage upon molding near a gate and a fluid terminal and also to a difference in orientation between the direction of flow and the transverse direction to the flow caused by the property of the liquid crystal polymer. Further, even if L/t is 100 or more, when L/h of the product is 10 or less, deformation by warpage rarely occurs by a rib effect, while the deformation by warpage significantly occurs in a product with the L/h of 10 or more. Thus, there are some cases that the connector after molding or after IR reflow cannot be in industrial use due to a deformation by warpage.

Up to now, compounding of various fillers has been carried out as an attempt for improving the mechanical properties and surface properties. However, investigation in fillers with an object of improving deformation caused by warpage has not been conducted so much.

For example, the use of various kinds of fillers has been disclosed in JP-A 63-146958. In that invention, adding amount and type of the filler are regulated, but the object thereof is to improve the surface properties of the liquid crystal polyester resin compositions, and neither attention nor consideration has been made on the deformation caused by warpage. Although amount and type of the filler are changed in it, any of them is hardly believed to fully achieve the low deformation by warpage.

Accordingly, there has been a demand for a material, which is suitable for connectors wherein the ratio (L/t) of the length (L) of the product to the average thickness (t) thereof is at least 100 and the ratio (L/h) of the length (L) of the product to the height (h) thereof is at least 10, and has a good dimensional accuracy and further little deformation by warpage without a great deterioration in mechanical properties such as bending property.

SUMMARY OF THE INVENTION

In view of the above-mentioned problem, the present inventors have carried out an intensive investigation for a material having an excellent property concerning the deformation caused by warpage and have found that, when a liquid crystal polymer (A) and one or more filler(s) are blended in a specific compounding ratio, the said deformation can be reduced without too much deterioration of the mechanical properties, whereupon they have accomplished the present invention.

That is, the present invention is to provide a liquid crystal polymer composition for connectors having a ratio (L/t) of the length (L) of the product to the average thickness (t) thereof of at least 100 and a ratio (L/h) of the length (L) of the product to the height (h) thereof of at least 10, which is obtained by blending 100 parts by weight of a liquid crystal polymer (A) with 5 to 100 parts by weight of a fibrous filler (B) having an average fiber diameter of 0.5 to 20 $\mu$m and an average aspect ratio not exceeding 10, and 5 to 100 parts by weight of a particulate filler (C) having an average particle diameter of 0.1 to 50 $\mu$m, the total amount of the fillers not exceeding 150 parts by weight.

The present invention is a computer machine or industrial equipment, or other machines, containing the connector described above. The present invention is also use of the above-described composition for connectors.

The present invention is a process for producing a connector, which comprises blending 100 parts by weight of a liquid crystal polymer (A) with 5 to 100 parts by weight of a fibrous filler (B) having an average fiber diameter of 0.5 to 20 $\mu$m and an average aspect ratio not exceeding 10, and 5 to 100 parts by weight of a particulate filler (C) having an average particle diameter of 0.1 to 50 $\mu$m, the total amount of the fillers not exceeding 150 parts by weight, and molding the mixture into a connector having a ratio (L/t) of the length (L) of the product to the average thickness (t) thereof of at least 100 and a ratio (L/h) of the length (L) of the product to the height (h) thereof of at least 10, and a method of preventing from deformation caused by warpage, a connector, which comprises blending 100 parts by weight of a liquid crystal polymer (A) with 5 to 100 parts by weight of a fibrous filler (B) having an average fiber diameter of 0.5 to 20 $\mu$m and an average aspect ratio not exceeding 10, and 5 to 100 parts by weight of a particulate filler (C) having an average particle diameter of 0.1 to 50 $\mu$m, the total amount of the fillers not exceeding 150 parts by weight, and molding the mixture to have a ratio (L/t) of the length (L) of the product to the average thickness (t) thereof of at least 100 and a ratio (L/h) of the length (L) of the product to the height (h) thereof of at least 10.

In the present invention, for example, one kind of filler materials is added in the two forms of (B) and (C). Alternatively, two different kinds of filler materials may be each formed into the shapes (B) and (C), and added. The total amount of all the added fillers is preferably 10–150 parts by weight.

DETAILED DESCRIPTION OF THE INVENTION

The present invention will now be illustrated in detail.

The liquid crystal polymer (A) used in the present invention is a melting-processable polymer having such a property that it can form an optically anisotropic molten phase.

The property of the anisotropic moltn phase can be confirmed by means of a common polarized test method utilizing orthogonal polarizers. To be more specific, confirmation of the anisotropic molten phase can be conducted by using a polarization microscope (manufactured by Leitz) and observing a melted sample placed on a Leitz hot stage in a nitrogen atmosphere with a magnification of 40. When tested between the orthogonal polarizers, the liquid crystal polymer which is applicable to the present invention is usually permeated through by the polarized light even under a stationary molten state and shows an optical anisotropy.

Although there is no particular limitation to the above-mentioned liquid crystal polymer (A), aromatic polyester or aromatic polyester amide is preferred. And the polyester partly containing the aromatic polyester or the aromatic polyester amide in the same molecular chain is also within the said range. Among these, substances having a logarithmic viscosity (I.V.) of preferably at least about 2.0 dl/g, more preferably, 2.0–10.0 dl/g upon dissolving in pentafluorophenol at 60° C. in a concentration of 0.1% by weight can be used.

With regard to the aromatic polyester or the aromatic polyester amide as a liquid crystal polymer (A) applicable in the present invention, the particularly preferred one is an aromatic polyester or an aromatic polyester amide having as a component at least one compound selected from the group consisting of aromatic hydroxycarboxylic acid, aromatic hydroxylamine and aromatic diamine.

More specifically;

(1) a polyester mainly consisting of one or more of aromatic hydroxycarboxylic acid and derivatives thereof;

(2) a polyester mainly consisting of (a) one or more of aromatic hydroxycarboxylic acid and derivatives thereof, (b) one or more of aromatic dicarboxylic acid, alicyclic dicarboxylic acid and derivatives thereof, and (c) at least one or more of aromatic diol, alicyclic diol, aliphatic diol and derivatives thereof;

(3) a polyester amide mainly consisting of (a) one or more of aromatic hydroxycarboxylic acid and derivatives thereof, (b) one or more of aromatic hydroxylamine, aromatic diamine and derivatives thereof, and (c) one or more of aromatic dicarboxylic acid, alicyclic dicarboxylic acid and derivatives thereof; and (4) a polyester amide mainly consisting of (a) one or more of aromatic hydroxycarboxylic acid and derivatives thereof, (b) one or more of aromatic hydroxylamine, aromatic diamine and derivatives thereof, (c) one or more of aromatic dicarboxylic acid, alicyclic dicarboxylic acid and derivatives thereof, and (d) at least one or more of aromatic diol, alicyclic diol, aliphatic diol and derivatives thereof.

A molecular weight adjusting agent may be further used together with the above-mentioned components, if necessary.

Preferred examples of specific compounds constituting the above-mentioned liquid crystal polymer (A) applicable to the present invention are aromatic hydroxycarboxylic acids such as p-hydroxybenzoic acid and 6-hydroxy-2-naphthoic acid; aromatic diols such as 2,6-dihydroxynaphthalene, 1,4-dihydroxynaphthalene, 4,4'-dihydroxybiphenyl, hydroquinone, resorcinol and the compounds represented by the following formulae (I) and (II); aromatic dicarboxylic acids such as terephthalic acid, isophthalic acid, 4,4'-diphenyldicarboxylic acid, 2,6-naphthalenedicarboxylic acid and the compounds represented by the following formula (III); and aromatic amines such as p-aminophenol and p-phenylenediamine.

(I)

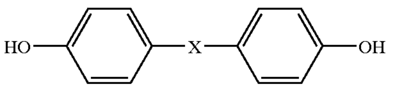

(II)

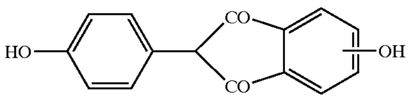

(III)

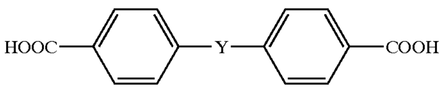

Particularly preferred liquid crystal polymer (A) usable in the present invention is an aromatic polyester amide having as the main constituting unit components p-hydroxybenzoic acid, 6-hydroxy-2-naphthoic acid, terephthalic acid and p-aminophenol.

In order to achieve a low deformation caused by warpage, which is an object of the present invention, it is necessary to blend 100 parts by weight of a liquid crystal polymer (A) with 5–100 parts by weight of a fibrous filler (B) having an average fibrous diameter of 0.5–20 μm and an average aspect ratio of not more than 10 and 5–100 parts by weight of a particulate filler (C) having an average particle size of 0.1–50 μm.

As for the fibrous filler having an average fibrous diameter of 0.5–20 μm and an average aspect ratio of not more than 10, various organic fibers such as glass milled fiber, carbon milled fiber, wollastonite, whisker, metal fiber, inorganic fiber and mineral fiber are applicable in the present invention.

With regard to the carbon milled fiber, a PAN fiber using polyacrylonitrile as a material and a pitch fiber using pitch as a material may be used.

With regard to the whisker, silicon nitride whisker, silicon trinitride whisker, basic magnesium sulfate whisker, barium titanate whisker, silicon carbide whisker, boron whisker, etc. can be used. As the metal fiber, fibers of soft steel, stainless steel and alloy thereof, brass, aluminum and alloy thereof, lead, etc. can be used.

With regard to the inorganic fiber, various fibers such as rock wool, zirconia, alumina-silica, potassium titanate, barium titanate, silicon carbide, alumina, silica and blast furnace slag can be used.

With regard to the mineral fiber, asbestos, wollastonite, etc. can be used.

Among them, milled fiber and wollastonite are preferred in view of their properties.

As for the milled fiber, milled fibers coated with metal such as nickel and copper, silane fiber, etc. can be used in addition to a common milled fiber. However, when an average aspect ratio thereof is more than 10, anisotropy becomes high by an influence of the fiber orientation whereby deformation by warpage becomes larger.

In order to achieve the low deformation by warpage, the more the adding amount of the fibrous filler, the better. But, an excess of the addition deteriorates the extrudability and moldability, particularly fluidity, and in addition lowers the mechanical strength. On the other hand, when the adding amount is too small, the low deformation by warpage cannot be exhibited as well. Therefore, the adding amount of the fibrous filler to 100 parts by weight of a liquid crystal polymer (A) is 5–100 parts by weight, preferably 10–70 parts by weight.

The particulate filler (C) in the present invention means a particulate substance having no spread to a specific direction such as fibers, plates or strips, and having an average aspect ratio of 1–2. An average particle size thereof is 0.1–50 μm. To be more specific, the particulate filler is what consists of a material including silicates such as kaolin, clay, vermiculite, talc, calcium silicate, aluminum silicate, feldspar powder, acid clay, pyrophyllite clay, sericite, sillimanite, bentonite, glasspowder, glassbeads, slatepowder and silane; carbonates such as calcium carbonate, chalk, barium carbonate, magnesium carbonate and dolomite; sulfates such as barite powder, branfix, precipitated calcium sulfate, calcined gypsum and barium sulfate; hydroxides such as hydrated alumina; oxides such as alumina, antimony oxide, magnesia, titanium oxide, zincwhite, silica, siliceous sand, quartz, whitecarbon and diatomaceous earth; sulf ides such as molybdenum disulfide; metal particles; etc.

Among them, glass beads, talc and titanium oxide are preferred in terms of cost and property.

In order to achieve a low deformation caused by warpage, the more the adding amount of the particulate filler, the better. But, an excess of the addition deteriorates the extrudability and moldability, and in addition lowers the mechanical strength. On the other hand, when the adding amount is too small, the low deformation by warpage cannot be exhibited as well. Therefore, the adding amount of the particulate filler to 100 parts by weight of a liquid crystal polymer (A) is 5–100 parts by weight, preferably 10–70 parts by weight.

In this case, the fibrous filler (B) is effective in improving the deformation by warpage and the mechanical properties. But, an excess of the addition makes the anisotropy of the material bigger. The particulate filler (C) is effective in improving the deformation by warpage and the anisotropy. But, an excess of the addition deteriorates the extrudability and moldability to make the material fragile. Therefore, it is necessary that the total adding amount of the components (B) and (C) is made not more than 150 parts by weight or, preferably, not more than 100 parts by weight.

It is also possible to compound 5–100 parts by weight of a fibrous filler (D) having an average fiber diameter of 5–20 μm and an average aspect ratio of not less than 15 for improving the mechanical properties. It is preferred that the fibrous filler (D) is added in an amount of 10–50 parts by weight because it has a higher average aspect ratio than the component (B) and has a higher anisotropy. When the amount is more than 100 parts by weight, degree of deformation by warpage undesirably becomes high. Glass fiber, carbon fiber, etc. are applicable as the fibrous filler (D). A PAN type using polyacrylonitrile as a material and a pitch type fiber using pitch as a material may be used as a carbon fiber. Among them, glass fiber is preferred in terms of cost and property.

When the component (D) is added, it is necessary that the total adding amount of the fillers is 150 parts by weight or less, preferably 100 parts by weight or less.

The fibrous filler and the particulate filler used in the present invention be used as they are, but it is also possible to use them together with commonly used known surface treatment agent and convergent agent.

Incidentally, a composition, wherein additives such as core agent, pigment (e.g., carbon black), antioxidant, stabilizer, plasticizer, lubricant, mold-releasing agent and flame retardant are added to the liquid crystal polymer composition for giving a desired properties, is also included within the liquid crystal polymer of the present invention.

In the liquid crystal composition of the present invention, use of two or more fillers can supplement disadvantage in each of them so that a material having a low degree of deformation by warpage can be obtained without deterioration of the mechanical property. Further, better properties can be exhibited under the condition that each of the fillers in the molded product is homogeneously dispersed and a dispersed state is that the particulate filler is present among the fibrous filler.

Such a liquid crystal polymer composition can be prepared by only blending them in the above-mentioned compounding ratio, and then kneading them. Usually, they are kneaded and extruded into pellets using an extruder and then used for an injection-molding, etc., but there is no limitation to such a kneading method by the use of an extruder only.

EXAMPLES

Figure 1:
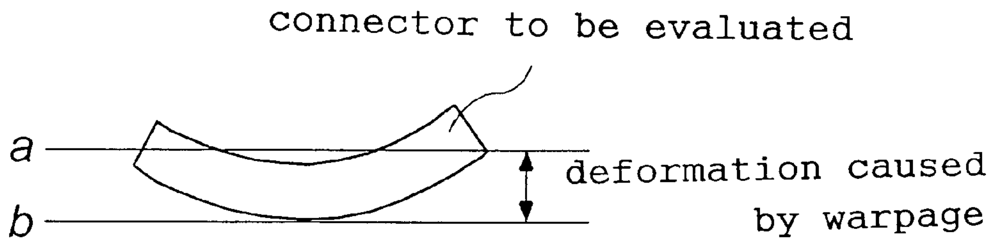
FIG. 1 is a drawing which shows the state of measurement of the deformation caused by warpage in the examples.

The present invention will now be illustrated specifically by way of the following examples although the present invention is not limited thereto. Incidentally, evaluating methods are as follows.

Amount of Deformation Caused by Warpage

With use of a test mold for connectors having a pitch between terminals of 0.6 mm, an average thickness (t) of the product of 0.3 mm and the outer size of the product of 4 mm width×4 mm height×60 mm length (shape 1) or 4 mm width×4 mm height×20 mm length (shape 2), a test piece was manufactured by injection-molding.

Ratio (L/t) of the length (L) to the average thickness (t) and ratio (L/h) of the length (L) to the height (h) of the product in each of the shapes are as follows.

Shape 1: $L/t=200$, $L/h=15$

Shape 2: $L/t=66$, $L/h=5$

The resulting test piece was enlarged by means of a universal projector. Lines a and b being made parallel, as shown in FIG. 1, the deformation of the lower surface in the longitudinal direction was measured.

Elastic Modulus

Elastic modulus (MPa) of the bent test piece having a thickness of 0.8 mm was measured according to ASTM D790.

Examples 1–4 and Comparative Examples 1–5

Liquid crystal polyester (Vectra E 950i; manufactured by Polyplastics Co., Ltd.) (10.0 parts by weight) was subjected to a dry blending with various fillers in the amounts as shown in Tables 1 and 2 for 100 parts by weight of the liquid crystal polymer, and then the mixture was melted and kneaded using a biaxial extruder to give pellets. When the above-mentioned test pieces were prepared from the said pellets using an injection molding machine and the deformation by warpage and the elastic modulus were evaluated, and results as shown in Tables 1 and 2 were obtained.

TABLE 1

| | | Ex. 1 | Ex. 2 | Ex. 3 | Ex. 4 |
|---|---|---|---|---|---|
| Fibrous Filler (B) | Type | MF | MF | Wollastonite | MF |
| | Adding Amount (parts by weight) | 20 | 50 | 20 | 25 |
| | Average Fiber Size (μm) | 10 | 10 | 8 | 10 |
| | Average Aspect Ratio | 7 | 7 | 5 | 7 |
| Particulate Filler (C) | Type | Talc | Talc | GB | Titanium Oxide |
| | Adding Amount (parts by weight) | 50 | 20 | 25 | 20 |
| | Average Fiber Size (μm) | 2.3 | 2.3 | 20 | 0.4 |
| Fibrous Filler (D) | Type | | | GF | GF |
| | Adding Amount (parts by weight) | | | 25 | 25 |
| | Average Fiber Size (μm) | | | 10 | 10 |
| | Average Aspect Ratio | | | 30 | 30 |
| Elastic Modulus | (Mpa) | 12000 | 12600 | 12100 | 12400 |
| Deformation Caused by Warpage Shape 1 | (mm) | 0.020 | 0.045 | 0.058 | 0.028 |
| Deformation Caused by Warpage Shape 2 | (mm) | 0.010 | 0.011 | 0.005 | 0.008 |

TABLE 2

| | | CEx. 1 | CEx. 2 | CEx. 3 | CEx. 4 | CEx. 5 |
|---|---|---|---|---|---|---|
| Fibrous Filler (B) | Type | | | MF | MF | Wollastonite |
| | Adding Amount (parts by weight) | | | 120 | 20 | 20 |
| | Average Fiber Size (μm) | | | 10 | 10 | 8 |
| | Average Aspect Ratio | | | 7 | 7 | 5 |
| Particulate Filler (C) | Type | Talc | | Talc | Talc | GB |
| | Adding Amount (parts by weight) | 20 | | 50 | 170 | 25 |
| | Average Fiber Size (μm) | 2.3 | | 2.3 | 2.3 | 20 |
| Fibrous Filler (D) | Type | GF | GF | | | GF |
| | Adding Amount (parts by weight) | 50 | 40 | | | 120 |
| | Average Fiber Size (μm) | 10 | 10 | | | 10 |
| | Average Aspect Ratio | 30 | 30 | | | 30 |
| Elastic Modulus | (MPa) | 16500 | 18000 | — | — | — |
| Deformation Caused by Warpage Shape 1 | (mm) | 0.395 | 0.469 | x | x | x |
| Deformation Caused by Warpage Shape 2 | (mm) | 0.014 | 0.021 | x | x | x |

x: extrusion impossible
MF: milled fiber
GF: chopped glass fiber
GB: glass beads

What is claimed is:

1. A liquid crystal polymer composition for connector product, having a ratio (L/t) of the length (L) of the product to the average thickness (t) thereof of at least 100 and a ratio (L/h) of the length (L) of the product to the height (h) thereof of at least 10, which is obtained by blending 100 parts by weight of a liquid crystal polymer (A) with 10 to 70 parts by weight of a fibrous filler (B) having an average fiber diameter of 0.5 to 20 μm and an average aspect ratio of not exceeding 10, and 5 to 100 parts by weight of a particulate filler (C) having an average particle diameter of 0.1 to 50 μm, the total amount of the fillers not exceeding 150 parts by weight.

2. The composition according to claim 1, further containing 5 to 100 parts by weight, for 100 parts by weight of the liquid crystal polymer (A), of a fibrous filler (D) having an average fiber diameter of 5 to 20 μm and an average aspect ratio of at least 15.

3. The composition according to claim 2, wherein the fibrous filler (B) is one or more of milled fibers and wollastonite.

4. The polymer composition according to claim 2, wherein the particulate filler (C) is one or more of talc and titanium oxide.

5. The composition according to claim 2, wherein the particulate filler (C) is glass beads.

6. The composition according to claim 2, wherein the liquid crystal polymer (A) is a polyester amide.

7. The composition according to claim 1, wherein the particulate filler (C) has an average particle diameter of 0.1 to 25 μm.

8. The composition according to claim 7, wherein the fibrous filler (B) is one or more of milled fibers and wollastonite.

9. The polymer composition according to claim 7, wherein the particulate filler (C) is one or more of talc and titanium oxide.

10. The composition according to claim 1, wherein the fibrous filler (B) is one or more of milled fibers and wollastonite.

11. The composition according to claim 10, wherein the particulate filler (C) has an average particle diameter of 0.1 to 25 μm.

12. The polymer composition according to claim 10, wherein the particulate filler (C) is one or more of talc and titanium oxide.

13. The polymer composition according to claim 1, wherein the particulate filler (C) is one or more of talc and titanium oxide.

14. The composition according to claim 1, wherein the particulate filler (C) is glass beads.

15. The composition according to claim 1, wherein the liquid crystal polymer (A) is a polyester amide.

16. A connector produced from the composition according to claim 1 and having a ratio (L/t) of the length (L) of the product to the average thickness (t) thereof of at least 100 and a ratio (L/h) of the length (L) of,the productito the height (h) thereof of at least 10.

17. A computer machine or industrial equipment, which contains the connector according to claim 16.

18. A process for producing a connector product, which comprises blending 100 parts by weight of a liquid crystal polymer (A) with 10 to 70 parts by weight of a fibrous filler (B) having an average fiber diameter of 0.5 to 20 μm and an average aspect ratio not exceeding 10, and 5 to 100 parts by weight of a particulate filler (C) having an average particle diameter of 0.1 to 50 μm, the total amount of the fillers not exceeding 150 parts by weight, and molding the mixture into a connector having a ratio (L/t) of the length (L) of the product to the average thickness (t) thereof of at least 100 and a ratio (L/h) of the length (L) of the product to the height (h) thereof of at least 10.

19. A method of preventing from deformation caused by warpage, a connector product, which comprises blending 100 parts by weight of a liquid crystal polymer (A) with 10 to 70 parts by weight of a fibrous filler (B) having an average fiber diameter of 0.5 to 20 μm and an average aspect ratio not exceeding 10, and 5 to 100 parts by weight of a particulate filler (C) having an average particle diameter of 0.1 to 50 μm, the total amount of the fillers not exceeding 150 parts by weight, and molding the mixture to have a ratio (L/t) of the length (L) of the product to the average thickness (t) thereof of at least 100 and a ratio (L/h) of the length (L) of the product to the height (h) thereof of at least 10.

* * * * *